(12) United States Patent
Proctor et al.

(10) Patent No.: US 10,108,861 B2
(45) Date of Patent: Oct. 23, 2018

(54) SYSTEMS AND METHODS OF PROVIDING CONTENT DIFFERENTIATION BETWEEN THUMBNAILS

(71) Applicant: MOTOROLA SOLUTIONS, INC., Chicago, IL (US)

(72) Inventors: Lee M. Proctor, Cary, IL (US); John K. Klingert, Warren, NJ (US); Jody A. Stowell, Lake in the Hills, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 109 days.

(21) Appl. No.: 15/270,691

(22) Filed: Sep. 20, 2016

(65) Prior Publication Data

US 2018/0082126 A1  Mar. 22, 2018

(51) Int. Cl.
*H04N 9/80* (2006.01)
*G06K 9/00* (2006.01)
(Continued)

(52) U.S. Cl.
CPC ....... *G06K 9/00758* (2013.01); *G06F 3/0482* (2013.01); *G06F 17/30852* (2013.01); *G06K 9/00744* (2013.01); *G11B 27/28* (2013.01)

(58) Field of Classification Search
None
See application file for complete search history.

(56) References Cited

U.S. PATENT DOCUMENTS 7,212,666 B2   5/2007 Zhang et al.

8,612,517 B1 * 12/2013 Yadid ............... H04N 21/25891
709/201

(Continued)

FOREIGN PATENT DOCUMENTS

| EP | 1024444 | 8/2000 |
|---|---|---|
| WO | 2015/191328 | 12/2015 |
| WO | 2015191328 | 12/2015 |

OTHER PUBLICATIONS

Song et al., "Joint Key-Frame Extraction and Object Segmentation for Content-Based Video Analysis," IEEE Trans on Circuits and Systems for Video Technology, vol. 16, No. 7, Jul. 2006, pp. 904-914.

(Continued)

*Primary Examiner* — Hung Dang
(74) *Attorney, Agent, or Firm* — Michael Best & Friedrich LLP

(57) ABSTRACT

A method and system of providing content differentiation between thumbnails. One method includes receiving a first video and selecting a first thumbnail from the first video. The method includes receiving a second video and selecting a second thumbnail from the second video. The method includes determining whether a first scene of the first video matches a second scene of the second video. The method includes comparing the first thumbnail and the second thumbnail to determine a thumbnail similarity when the first scene of the first video matches the second scene of the second video. The method includes selecting a new thumbnail to replace either the first thumbnail or the second thumbnail when the thumbnail similarity meets or exceeds a predetermined threshold. The method includes displaying the new thumbnail and the other of the first thumbnail and the second thumbnail.

18 Claims, 5 Drawing Sheets

(51) Int. Cl.
*G06F 3/0482* (2013.01)
*G11B 27/28* (2006.01)
*G06F 17/30* (2006.01)

(56) References Cited

U.S. PATENT DOCUMENTS

| | | |
|---|---|---|
| 2004/0189691 A1* | 9/2004 | Jojic ................. G06F 17/30825 715/720 |
| 2014/0099034 A1 | 4/2014 | Rafati et al. |
| 2014/0157097 A1 | 6/2014 | Besterman et al. |
| 2014/0269930 A1 | 9/2014 | Robinson et al. |
| 2014/0286624 A1* | 9/2014 | Eronen .............. H04N 21/4828 386/278 |
| 2015/0131967 A1 | 5/2015 | Batiz et al. |
| 2015/0235672 A1 | 8/2015 | Cudak et al. |
| 2015/0279428 A1* | 10/2015 | Ryu ....................... G11B 27/28 386/241 |

OTHER PUBLICATIONS

PCT/US2017/048261 International Search Report and Written Opinion of the International Searching Authority dated Nov. 28, 2017 (14 pages).
Zhang et al., "Web video thumbnail recommendation with content-aware analysis and query-sensitive matching," Multimedia Tools and Applications, Kluwer Academic Publishers, Boston, US, vol. 73, No. 1, Jul. 24, 2013, pp. 547-571, XP035396040, ISSN: 1380-7501, DOI:10.1007/S11042-013-1607-5 [retrieved on Jul. 24, 2013].

* cited by examiner

US 10,108,861 B2

SYSTEMS AND METHODS OF PROVIDING CONTENT DIFFERENTIATION BETWEEN THUMBNAILS

BACKGROUND OF THE INVENTION

Thumbnails of videos may be used in a variety of ways. For example, a graphical user interface may display multiple thumbnails that represent videos stored in a database that are identified in response to a search query. Each thumbnail may be a frame selected from the video it represents or a series of frames (for example, an animated Graphics Interchange Format (GIF) file) selected from the video it represents. In many cases, different videos that have similar content (for example, videos of approximately the same location that were captured at approximately the same time) are represented by similar thumbnails on the user interface.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
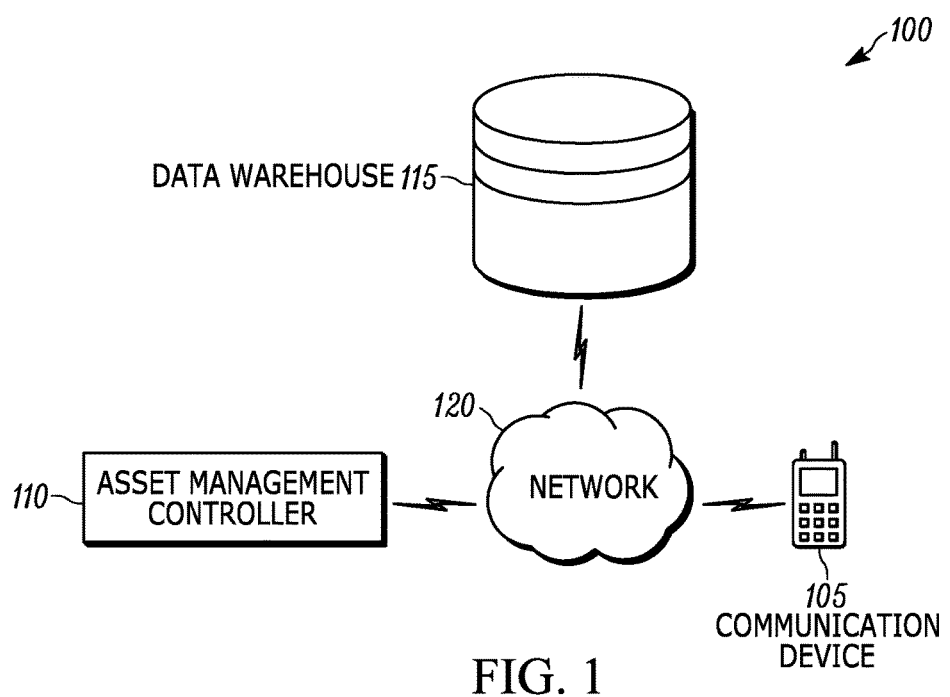
FIG. 1 is a diagram of a communication system according to one exemplary embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One embodiment provides a method of providing content differentiation between thumbnails. The method includes receiving, with a network interface, a first video and selecting, with an electronic processor, a first thumbnail from the first video. The method includes receiving, with the network interface, a second video and selecting, with the electronic processor, a second thumbnail from the second video. The method includes determining, with the electronic processor, whether a first scene of the first video matches a second scene of the second video. The method includes comparing, with the electronic processor, the first thumbnail and the second thumbnail to determine a thumbnail similarity when the first scene of the first video matches the second scene of the second video. The method includes selecting, with the electronic processor, a new thumbnail to replace either the first thumbnail or the second thumbnail when the thumbnail similarity meets or exceeds a predetermined threshold. The method includes displaying, on a user interface of a communication device, the new thumbnail and the other of the first thumbnail and the second thumbnail.

Another embodiment provides a communication device for displaying thumbnails representative of videos. The communication includes an electronic processor, a network interface, and a display. The communication device is configured to receive, with the network interface, a first video and select, with the electronic processor, a first thumbnail from the first video. The communication device is configured to receive, with the network interface, a second video and select, with the electronic processor, a second thumbnail from the second video. The communication device is configured to determine, with the electronic processor, whether a first scene of the first video matches a second scene of the second video. When the first scene of the first video matches the second scene of the second video, the communication device is configured to compare, with the electronic processor, the first thumbnail and the second thumbnail to determine a thumbnail similarity. When the thumbnail similarity meets or exceeds a predetermined threshold, the communication device is configured to select, with the electronic processor, a new thumbnail to replace either the first thumbnail or the second thumbnail. The communication device is configured to display a graphical user interface, on the display, that includes the new thumbnail and the other of the first thumbnail and the second thumbnail.

For ease of description, some or all of the exemplary systems presented herein are illustrated with a single exemplar of each of its component parts or a limited number of component parts. Some examples may not describe or illustrate all components of the systems. Other exemplary embodiments may include more or fewer of each of the illustrated components, may combine some components, or may include additional or alternative components. Additionally, systems and devices may perform functionality other than the functionality described.

FIG. 1 is a diagram of a communication system 100 according to one exemplary embodiment. In the example illustrated, the communication system 100 includes a communication device 105, an asset management controller 110, a data warehouse 115, and a network 120. The terms "asset," as used herein, refers to a multimedia file (for example, a video recording) captured, stored, and displayed by operation of the communication system 100.

The communication device 105, the asset management controller 110, and the data warehouse 115 communicate with each other over the network 120. The network 120 may be a wired or a wireless communication network. All or parts of the network 120 may be implemented using various existing networks, for example, a cellular network, the Internet, a land mobile radio (LMR) network, a Bluetooth™ network, a wireless local area network (for example, Wi-Fi), a wireless accessory Personal Area Networks (PAN), a Machine-to-machine (M2M) autonomous network, and a public switched telephone network. The network 120 may also include future developed networks. In some embodiments, the network 120 may also include a combination of the networks mentioned previously herein. In some embodiments, the communication device 105 communicates with the asset management controller 110, the data warehouse 115, and other devices using an ad hoc peer-to-peer network. In such embodiments, one of the communication device 105, the asset management controller 110, the data warehouse 115, and the other devices may include one or more components that facilitate a method of thumbnail differentiation as described in greater detail below.

In some embodiments, the communication device 105 is a portable device designed to be carried and used by public safety personnel (for example, police, firefighters, paramedics, and the like). The communication device 105 may also be a cellular telephone, a portable radio, a mobile radio mounted in or on a vehicle, a tablet, a smart watch, and the like. In some embodiments, the communication device 105 is a personal computer or a computer maintained for example, at a call center or public safety command center.

In some embodiments, the data warehouse 115 is a repository for storing data (for example, videos) electronically. The data warehouse 115 is capable of communicating and exchanging data with the communication device 105 and the asset management controller 110 over the network 120. In some embodiments, the data warehouse 115 is a commercial cloud-based storage device. In some embodiments, the data warehouse 115 is housed on a suitable database server. In some embodiments, the data warehouse 115 or an additional data warehouse is integrated with, or internal to, the asset management controller 110.

In some embodiments, the asset management controller 110 communicates with and controls the communication device 105 to offload and store assets in the data warehouse 115 and to download assets from the data warehouse 115. In some embodiments, the asset management controller 110 is a computer maintained, for example, at a call center or public safety command center. In some embodiments, the asset management controller 110 is a computer located in or on a vehicle (for example, a public safety vehicle such as a police vehicle). In some embodiments, the functionality of the asset management controller 110 is integrated into the communication device 105 or another device of the communication system 100.

Although the exemplary embodiment of FIG. 1 illustrates one of the communication device 105, the asset management controller 110 and the data warehouse 115, additional communication devices, asset management controllers, and data warehouses may be included in other embodiments.

Figure 2:
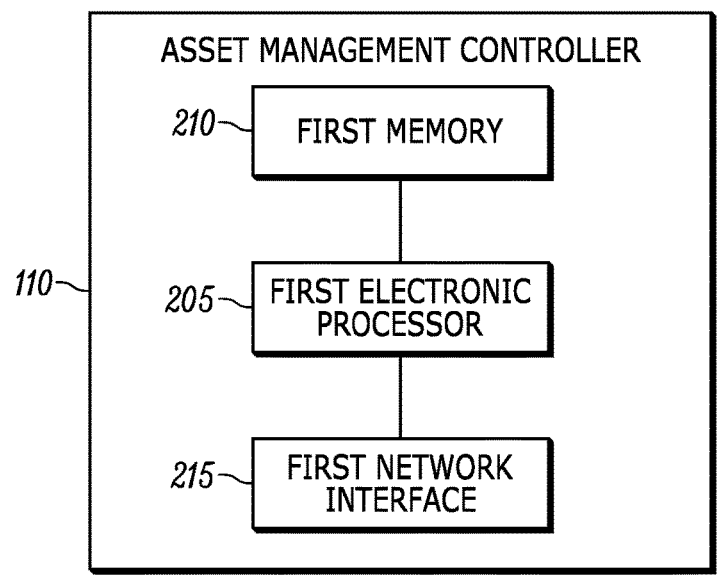
FIG. 2 is a block diagram of an asset management controller included in the communication system of FIG. 1 according to one exemplary embodiment.

FIG. 2 is a diagram of one exemplary embodiment of the asset management controller 110. In the embodiment illustrated, the asset management controller 110 includes a first electronic processor 205 (for example, a microprocessor, or other electronic controller), a first memory 210, and a first network interface 215. The first electronic processor 205, the first memory 210, and the first network interface 215, as well as the other various modules are coupled directly, by one or more control or data buses, or a combination thereof.

The first memory 210 may include read only memory (ROM), random access memory (RAM), other non-transitory computer-readable media, or a combination thereof. The first electronic processor 205 is configured to receive instructions and data from the first memory 210 and execute, among other things, the instructions. In particular, the first electronic processor 205 executes instructions stored in the first memory 210 to perform one or more methods described herein. For example, the first electronic processor 205 is configured to create thumbnails with differentiating content for videos that have similar content as explained in greater detail below.

The first electronic processor 205 controls the first network interface 215 to send and receive data over the network 120. For example, the first network interface 215 may include a transceiver for wirelessly coupling to the network 120. Alternatively, or in addition, the first network interface 215 may include a connector or port for receiving a wired connection (for example, Ethernet) to the network 120.

Figure 3:
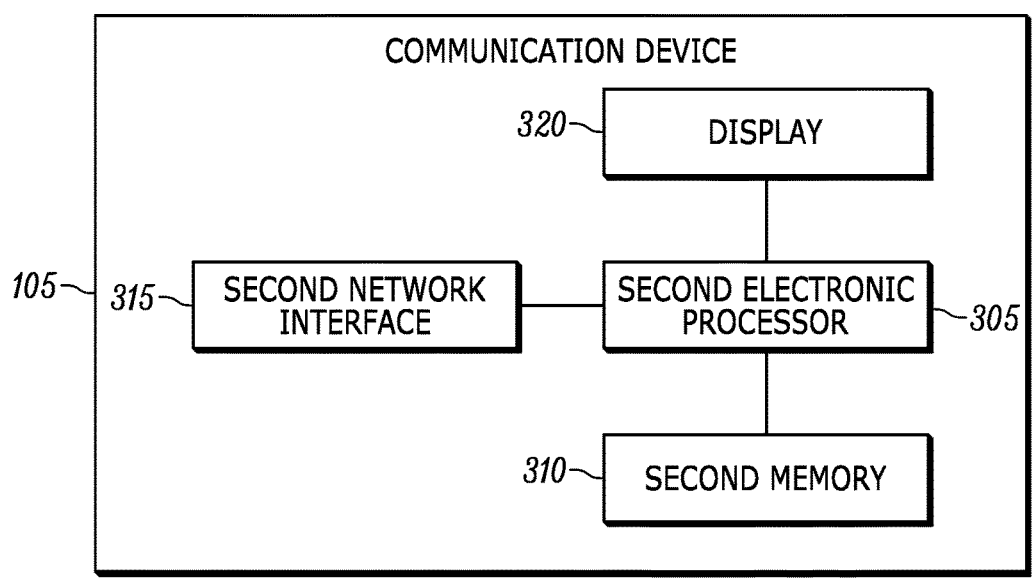
FIG. 3 is a block diagram of a communication device included in the communication system of FIG. 1 according to one exemplary embodiment.

FIG. 3 is a diagram of one exemplary embodiment of the communication device 105. In the embodiment illustrated, the communication device 105 includes a second electronic processor 305, a second memory 310, and a second network interface 315. These components are similar to those described above with respect to the communication device 105 and perform similar functions. The communication device 105 also includes a display 320. In some embodiments, the display 320 is a touch-sensitive display that includes both a display device (for example, a liquid crystal display (LCD) screen panel) and a user input device (for example, the touch-sensitive component that detects contact by a stylus or finger). The second electronic processor 305 may receive input signals from the display 320 that are generated by a user of the communication device 105. The second electronic processor 305 may also control content of the display 320 (for example, by providing a graphical user interface on the display 320). In some embodiments (for example, in embodiments where the communication device 105 is a personal computer), the display 320 may be a computer monitor that receives user input via a mouse. In some embodiments, the communication device 105 includes additional components including, for example, a camera, a microphone, a speaker, and a geographic coordinate system.

In some embodiments, the second electronic processor 305 is programmed or otherwise configured to display thumbnails of videos that are representative of the videos on the display 320. For example, in response to a user input to search for videos that include specified content (in other words, a search query), the second electronic processor 305 may cause the display 320 to display thumbnails of videos that include the specified content or content similar to the specified content. For example, in some embodiments, the communication device 105 sends a search query to the asset management controller 110 that includes the specified content. The asset management controller 110 may then search the data warehouse 115 to identify videos that relate to the specified content using a search algorithm to create a set of search results.

The asset management controller 110, and in particular, the first electronic processor 205, samples the videos included in the search results and selects thumbnails for each video as described in greater detail below. In some embodiments, to sample the videos included in the search results, the asset management controller 110 retrieves or downloads each video from the data warehouse 115 by communicating with the data warehouse 115 over the network 120. In other embodiments, the asset management controller 110 samples the videos included in the search results by streaming the videos over the network 120 without retrieving or downloading the videos from the data warehouse 115.

The thumbnail selected to represent each video may be a frame selected from the video it represents or a series of frames (for example, an animated Graphics Interchange Format (GIF) file) selected from the video it represents. In embodiments where each thumbnail is a series of frames, the frames may be consecutive frames from each video or sequential frames in each video that are not necessarily consecutive. While the following description refers to a "frame" selected as a thumbnail, this term as used herein, similarly applies to a series of frames selected as a thumbnail.

Figure 4A:
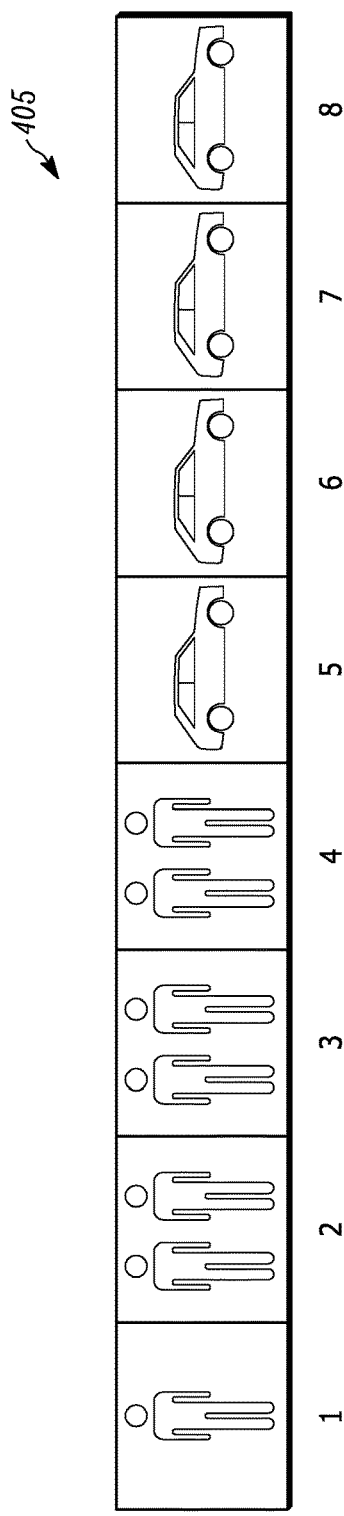
FIG. 4A is a diagram of video frames of an exemplary first video.
Figure 4B:
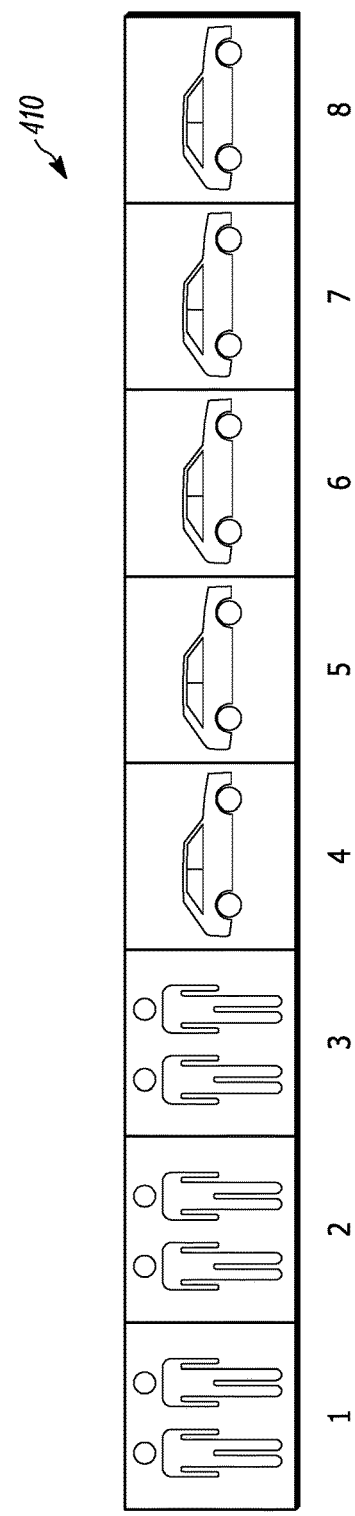
FIG. 4B is a diagram of video frames of an exemplary second video.

FIG. 4A illustrates frames of an exemplary first video 405 included in the search results for which the first electronic processor 205 selects a first thumbnail. FIG. 4B illustrates frames of an exemplary second video 410 included in the search results for which the first electronic processor 205 selects a second thumbnail. The frames of the first video 405 and the second video 410 are labeled for ease of reference herein. As shown in FIGS. 4A and 4B, the first video 405 and the second video 410 include similar content (for example, the first video 405 and the second video 410 may have been captured by cameras at the same general location that were located at different vantage points).

To select the thumbnails of the first video 405 and the second video 410, the first electronic processor 205 may use one of many methods of selecting thumbnails from videos. In some embodiments, the first electronic processor 205 selects the thumbnails by selecting a frame that is a fixed amount of time into each video (for example, the thumbnail of each video is selected to be a frame ten seconds into the each video). When such a method is used to select thumbnails of the first video 405 and the second video 410 shown in FIGS. 4A and 4B, the thumbnails often include similar content that may make the thumbnails difficult to differentiate. For example, because frames 2, 3, and 5 through 8 of the first video 405 and the second video 410 include similar content, the thumbnails selected according to this method include similar content when the fixed amount of time is set such that these frames are selected as thumbnails.

In other embodiments, the first electronic processor 205 uses a video analytics engine to select the thumbnails of each video. For example, the video analytics engine may select a frame that occurs most often within each video to be the thumbnail for the video (in other words, a frame that represents the most prevalent content in each video). However, similar to the previous exemplary method, when such a method is used to select thumbnails of the first video 405 and the second video 410 shown in FIGS. 4A and 4B, the thumbnails include similar content that may make the thumbnails difficult to differentiate. For example, the most prevalent content in both of the first video 405 and the second video 410 is a vehicle shown in frames 5 through 8 of the first video 405 and shown in frames 4 through 8 of the second video 410. When thumbnails of the first video 405 and the second video 410 are selected based on the most prevalent content, the first thumbnail (for example, frame 6 of the first video 405) and the second thumbnail (for example, frame 5 of the second video 410) both include similar content (for example, the vehicle) that may make the thumbnails difficult to differentiate.

In other embodiments, the video analytics engine may select a frame that most closely correlates with the specified content of a search query to be the thumbnail for each video (for example, a frame that includes a blue vehicle when the search query was directed to a blue vehicle). However, similar to the exemplary methods described previously herein, such a method of selecting thumbnails often results in thumbnails with similar content that may make the thumbnails difficult to differentiate.

After selecting the thumbnails of the videos included in the search results, the asset management controller 110 transmits data indicative of the thumbnails to the communication device 105. The communication device 105 displays the thumbnails on the display 320 to be optionally selected by a user. Upon selection of a thumbnail by the user, the communication device 105 may play the video by retrieving or downloading the video from the data warehouse 115 or by streaming the video from the data warehouse 115 over the network 120. While the asset management controller 110, and in particular, the first electronic processor 205, has been described previously herein as the device that searches the data warehouse 115 and creates thumbnails for the videos included in the search results, in some embodiments, the communication device 105, and in particular, the second electronic processor 305, performs one or both of these tasks.

As described previously herein, in many cases, different videos that have similar content (for example, the first video 405 and the second video 410) are represented by similar thumbnails.

Figure 5:
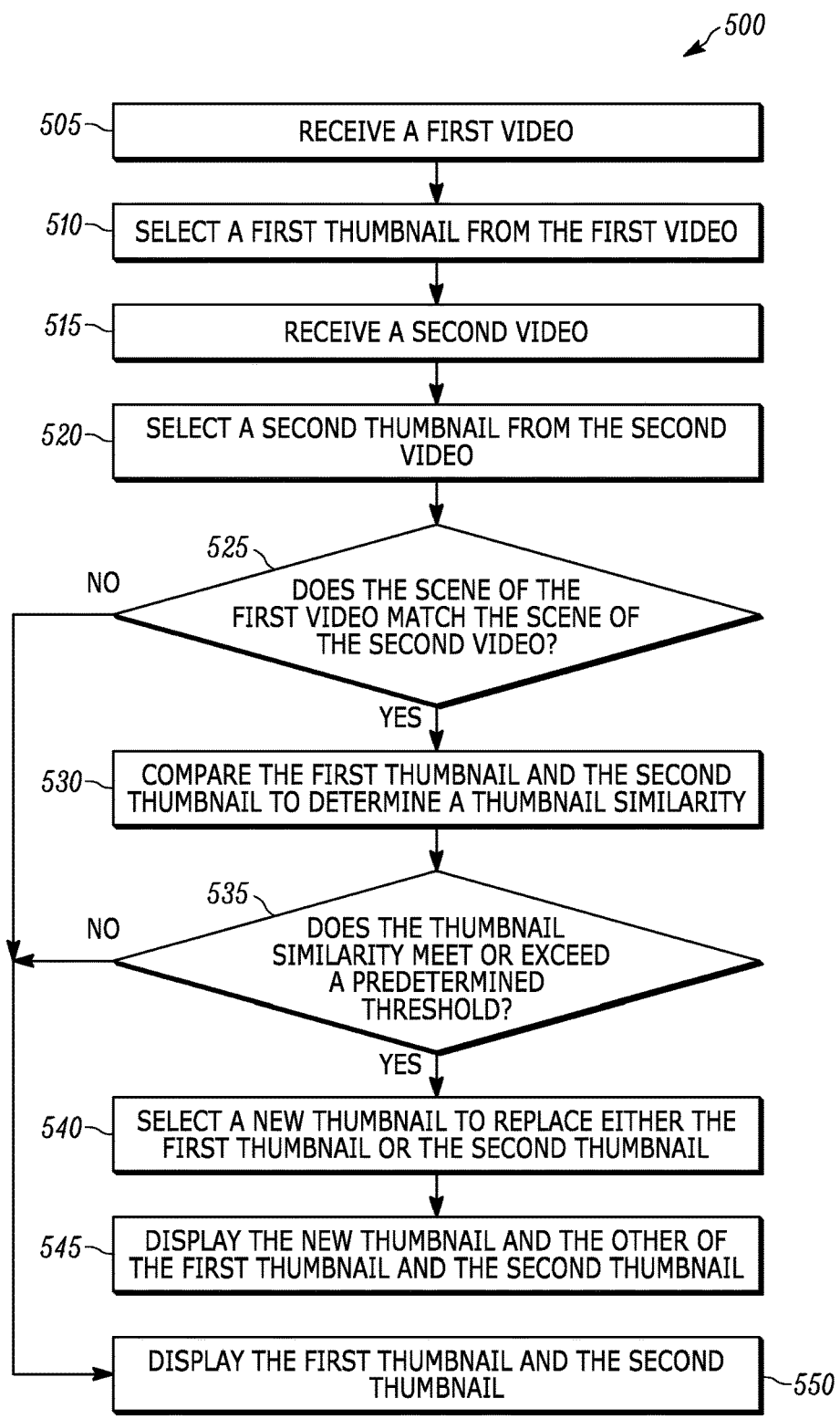
FIG. 5 is a flowchart of a method of providing content differentiation between thumbnails performed by the communication system of FIG. 1 according to one exemplary embodiment.

FIG. 5 illustrates a method 500 of providing content differentiation between thumbnails. The thumbnails created via the method 500 are more differentiated and, in some instances, more representative than thumbnails created by simply sampling frames from videos, particularly when the videos include similar content (for example, videos of the same general location taken from different vantage points such as the first video 405 of FIG. 4A and the second video 410 of FIG. 4B). Although the method 500 is described as being executed by the first electronic processor 205 of the asset management controller 110, in some embodiments, the method 500 is performed by the second electronic processor 305 of the communication device 105 or by another device in the communication system 100. The method 500 is executed by a device that has identified or received a plurality of videos that are to be represented by thumbnails (for example, in response to a search query as described above). For ease of explanation, the method 500 is illustrated and described with respect to two videos (in other words, a first video and a second video). However, in some embodiments the method 500 may be used to create thumbnails with differentiating content for more than two videos as explained in greater detail below. In the following description of the method 500, description of the first video and the second video does not necessarily refer to the first video 405 of FIG. 4A and the second video 410 of FIG. 4B. Specific reference is made to the first video 405 and the second video 410 when examples are intended to be represented by the first video 405 and the second video 410.

At block 505, the first electronic processor 205 receives a first video. The term "receive" as used when describing videos received at blocks 505 and 515 means that a device has retrieved or downloaded a video from the data warehouse 115 or that a device has identified a video to stream from the data warehouse 115 to select a thumbnail for the video. For example, the first electronic processor 205 may have identified the first video in response to a search query from the communication device 105 as explained previously herein.

At block 510, the first electronic processor 205 selects a first thumbnail from the first video. In some embodiments, the first electronic processor 205 selects the first thumbnail using one of the methods of selecting thumbnails from videos as described previously herein (for example, selecting a frame that is a fixed amount of time into the first video, selecting a frame that represents the most prevalent content in the first video, selecting a frame that most closely correlates with the specified content of a search query, and the like).

At block 515, the first electronic processor 205 receives a second video. At block 520, the first electronic processor 205 selects a second thumbnail from the second video. In some embodiments, the first electronic processor 205 selects the second thumbnail using the same method that was used to select the first thumbnail.

At block 525, the first electronic processor 205 determines whether a scene of the first video matches a scene of the second video. As used herein, the term "scene" refers to the content of each video and may include at least one of the background viewable in the video and one or more objects viewable in the video. As used herein, the terms "match" and "matches" refer to at least one of scenes that are similar to each other and scenes that are related to each other through at least one common characteristic as explained in greater detail below. In some embodiments, scenes that are determined to be matching may not necessarily be identical and may have at least some differentiating content. For example, in some embodiments, a stationary camera that captures video at a single location at different times may capture videos with non-matching scenes even though the background of each video is the same. For example, a security camera may always view a sidewalk next to a building. However, in some embodiments, the scene of one video from the security camera that includes an empty sidewalk may be considered not to match with the scene of a different video from the same security camera that includes a crowded sidewalk. In alternate embodiments, the opposite may be true, and the scene of one video may be determined to match the scene of another video when the two videos share similar backgrounds but include different objects in front of the backgrounds.

In some embodiments, the first electronic processor 205 determines whether the scene of the first video matches the scene of the second video by comparing information associated and stored with each of the first video and the second video. For example, videos may be stored or uploaded to the data warehouse 115 with information including, for example, an identification of the camera that captured the video, a location of the camera that captured the video, and a time and date that the camera captured the video. In some embodiments, the first electronic processor 205 may determine that the scenes of the first video and the second video match when such information indicates at least one of that both videos were captured from the same camera, that both videos were captured at approximately the same time on the same date, and that both videos were captured at approximately the same location.

In some embodiments, videos may be stored or uploaded to the data warehouse 115 with incident identification tags that identify content of the videos. For example, the information mentioned previously herein (for example, identification of the camera that captured the video, location of the camera that captured the video, time and date that the camera captured the video, and the like) may be included in the incident identification tag. In some embodiments, upon uploading a video to the data warehouse 115, a user may manually enter a name of an incident or an event to be included in the incident identification tag (for example, "2016 Olympic Games," "Aug. 8, 2016 Department Store Fire," and the like).

In some embodiments, the first electronic processor 205 determines whether the scene of the first video matches the scene of the second video using a video analytics engine. For example, the video analytics engine may determine a scene similarity score between the first video and the second video by comparing at least one of the backgrounds of the videos and one or more objects viewable in the videos. The first electronic processor 205 may compare the scene similarity score to a predetermined threshold to determine whether the scene of the first video matches the scene of the second video.

When the first electronic processor 205 determines that the scene of the first video does not match the scene of the second video, the method 500 proceeds to block 550. At block 550, the first electronic processor 205 transmits the thumbnails for the first video and the second video to the communication device 105 via the first network interface 215. The communication device 105 receives the thumbnails via the second network interface 315 and provides a graphical user interface on the display 320 that includes the thumbnails. Because the thumbnails are from videos that do not have matching scenes, the thumbnails do not include similar content and a user should be able to easily differentiate between the first thumbnail and the second thumbnail.

When the first electronic processor 205 determines that the scene of the first video matches the scene of the second video, at block 530, the first electronic processor 205 compares the first thumbnail and the second thumbnail to determine a thumbnail similarity. In some embodiments, the first electronic processor 205 uses the video analytics engine mentioned previously herein to determine the thumbnail similarity. For example, the video analytics engine may compare one or more objects that are in focus in each thumbnail while ignoring other areas of the thumbnail. In some embodiments, the thumbnail similarity is based on recognition of at least one of a color of one or more objects, a size of one or more objects, a shape of one or more objects (for example, recognition of humans, animals, and the like), motion of objects, and a number of recognized objects (for example, a number of humans viewable within the frame). In some embodiments, the thumbnail similarity is based on recognition of one or more objects included in the specified content of a search query (in other words, the thumbnails are compared relative to the specified content to determine whether the thumbnails include similar content such as a similar object).

Referring back to and continuing the security camera example mentioned previously herein, the thumbnails from the first video and the second video may have a high thumbnail similarity when both thumbnails include a person in a red shirt on the sidewalk. As another example, the thumbnail similarity between the first thumbnail and the second thumbnail may be less than that of the previous example when the first thumbnail includes a person in a red shirt and the second thumbnail includes a person in a yellow shirt or when the second thumbnail includes multiple people. As a further example, the thumbnail similarity between the first thumbnail and the second thumbnail may be even less when the first thumbnail includes a person in a red shirt and the second thumbnail includes a green vehicle. In some embodiments, the thumbnail similarity may be a numerical score determined by the video analytics engine.

At block 535, the first electronic processor 205 determines whether the thumbnail similarity between the first thumbnail and the second thumbnail meets or exceeds a predetermined threshold. Referring back to the previous security camera examples of comparisons between the first thumbnail and the second thumbnail, in some embodiments, the thumbnail similarity exceeds the predetermined threshold when both thumbnails include a person in a red shirt. On the other hand, in some embodiments, the thumbnail similarity does not exceed the predetermined threshold when the first thumbnail includes a person in a red shirt and the second thumbnail includes a green vehicle. As another set of examples, referring back to FIGS. 4A and 4B, the thumbnail similarity exceeds the predetermined threshold when the first thumbnail is frame 6 of the first video 405 and the second thumbnail is frame 5 of the second video 410. On the other hand, the thumbnail similarity does not exceed the predetermined threshold when the first thumbnail is frame 1 of the first video 405 and the second thumbnail is frame 5 of the second video 410.

When the thumbnail similarity does not meet or exceed the predetermined threshold, the method 500 proceeds to block 550 and transmits the thumbnails to the communication device 105 for display on the graphical user interface on the display 320. Because the thumbnails do not have a thumbnail similarity that meets or exceeds the predetermined threshold, the thumbnails do not include similar content and a user should be able to easily differentiate between the first thumbnail and the second thumbnail.

When the thumbnail similarity meets or exceeds the predetermined threshold, at block 540, the first electronic processor 205 selects a new thumbnail to replace either the first thumbnail or the second thumbnail. The first electronic processor 205 may select a new thumbnail in a number of ways. In some embodiments, the first electronic processor 205 records which frame was used as the second thumbnail and discards the second thumbnail. Then the first electronic processor 205 selects a new second thumbnail from the second video using the same method as was used to select the original second thumbnail. In doing so, the first electronic processor 205 does not select the recorded frame that was used as the original second thumbnail. After the first electronic processor 205 selects a new second thumbnail, the first electronic processor 205 repeats blocks 530 and 535 to determine whether the new second thumbnail is similar to the first thumbnail. If the thumbnail similarity between the first thumbnail and the new second thumbnail meets or exceeds the predetermined threshold, the first electronic processor 205 continues to select new second thumbnails and repeat the comparison of the thumbnails at blocks 530, 535, and 540. The first electronic processor 205 may continue to repeat these blocks until the thumbnail similarity between the first thumbnail and the new second thumbnail is less than the predetermined threshold. For example, referring back to FIGS. 4A and 4B, when the first thumbnail is frame 6 of the first video 405 and the second thumbnail is frame 5 of the second video 410, the first electronic processor 205 continues to select different frames from the second video 410 until one of frames 1 through 3 is selected as the second thumbnail. Repetition of blocks 530, 535, and 540 allows for the first thumbnail and the second thumbnail to be selected such that the thumbnails include differentiating content.

In alternate embodiments, at block 540, the first electronic processor 205 selects a new thumbnail by determining which of the first video and the second video better represents similar content included in the first thumbnail and the second thumbnail. For example, the first electronic processor 205 may determine a first prevalence score relative to the similar content for the first video and may determine a second prevalence score relative to the similar content for the second video. When the first thumbnail and the second thumbnail represent similar content that is more prevalent in the first video than in the second video (in other words, when the first prevalence score is higher than the second prevalence score), the first electronic processor 205 selects a new second thumbnail. On the other hand, when the first thumbnail and the second thumbnail represent similar content that is more prevalent in the second video than in the first video (in other words, when the second prevalence score is higher than the first prevalence score), the first electronic processor 205 selects a new first thumbnail. FIGS. 4A and 4B are illustrative of this second example. When the first thumbnail is frame 6 of the first video 405 and the second thumbnail is frame 5 of the second video 410, the thumbnails represent similar content (in other words, the same vehicle). As shown in FIGS. 4A and 4B, this similar content is more prevalent in the second video 410 (included in frames 4 through 8) than in the first video 405 (included in frames 5 through 8). Accordingly, the first electronic processor 205 selects a new first thumbnail for the first video 405 in this example. In some embodiments, the first electronic processor 205 determines the prevalence score of a video based on a percentage of the frames in the video that show the similar content or based on a total number of frames in the video that show the similar content.

In some embodiments, the first electronic processor 205 may select a new thumbnail that corresponds to the next most prevalent content in the video whose thumbnail is being replaced. To make such a selection, the first electronic processor 205 may include a video analytics engine as described previously herein to analyze the content of the first video and the second video. For example, referring back to and continuing the example with the first video 405 and the second video 410, the video analytics engine determines that frames 2 through 4 of the first video 405 include the next most prevalent content in the first video 405. Accordingly, the first electronic processor 205 selects one of frames 2 through 4 as the new first thumbnail of the first video 405.

In some embodiments, the first electronic processor 205 selects a new thumbnail using the same method that was used to select the original thumbnails. In such embodiments, the first electronic processor 205 continues to select new thumbnails and repeat the comparison of the thumbnails at blocks 530, 535, and 540 until the thumbnail similarity between the thumbnails is less than the predetermined threshold.

In similar alternate embodiments, at block 540, the first electronic processor 205 selects a new thumbnail by determining which of the first video and the second video better represents specified content of a search query. In such embodiments, the first electronic processor 205 may make such a determination based on the prevalence scores described previously herein. The first electronic processor 205 may determine the prevalence scores of the first video and the second video based on other characteristics in addition to or as an alternative to the prevalence of the similar content in each video (for example, the size of the similar content within each frame and whether the similar content is in focus). For example, when a search query is directed to a blue vehicle, the first thumbnail and the second thumbnail may each include the same blue vehicle. Such thumbnails with similar content may make the thumbnails difficult to differentiate. Continuing with the blue vehicle example, the first electronic processor 205 may determine the prevalence scores for each of the first video and the second video using the video analytics engine to evaluate at least one of which video includes more frames that include the blue vehicle, which video includes more frames that include the blue vehicle in focus, and which video includes more frames with the blue vehicle above a predetermined size within each frame. The first electronic processor 205 then replaces the thumbnail whose video is less representative of the blue vehicle (in other words, the video with the lower prevalence score relative to the blue vehicle) according to one of the methods described previously herein. For example, the first electronic processor 205 may select a new thumbnail that corresponds to the next most prevalent content in the video whose thumbnail is being replaced as described previously herein.

In some embodiments, the first electronic processor 205 selects one or both of the first thumbnail and the second thumbnail based on a contextual event or an acoustic event in one or both of the first video and the second video. For example, the first electronic processor 205 may select the thumbnail of one or more videos based on an occurrence of a contextual event in the one or more videos (for example, a lightning strike, a change in condition of lighting, a detection of motion, and the like). In some embodiments, the contextual event is sensed by a context sensor associated with a camera that captured the video. The context sensor may be, for example, a light sensor, a motion sensor, a thermal sensor, and an environmental sensor (for example, a carbon monoxide sensor). In some embodiments, the video analytics engine of the first electronic processor 205 may determine an occurrence of one or more contextual events by analyzing video data. In some embodiments, the first electronic processor 205 may select the thumbnail of one or more videos based on an occurrence of an acoustic event (in other words, a sound) in the one or more videos (for example, a gunshot, a sound produced by a car accident, and the like). In some embodiments, the acoustic event is sensed by a microphone associated with a camera that captured the video. In some embodiments, the first electronic processor 205 may determine an occurrence of one or more acoustic events by analyzing audio data that was simultaneously captured with the video.

Figure 6A:
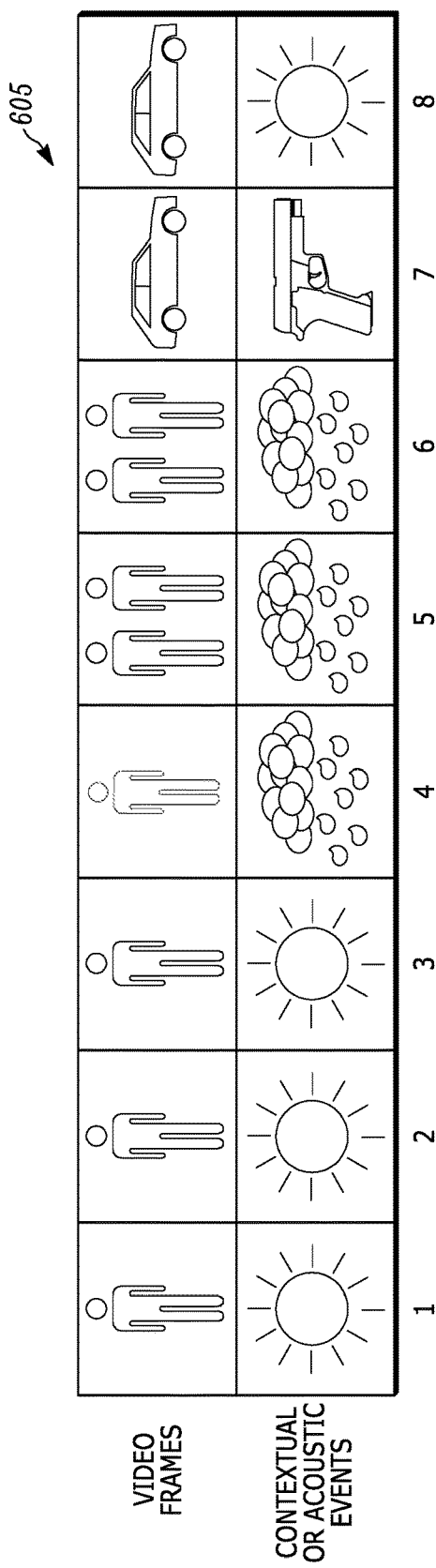
FIG. 6A is a diagram of video frames and corresponding contextual or acoustic events of another exemplary first video.
Figure 6B:
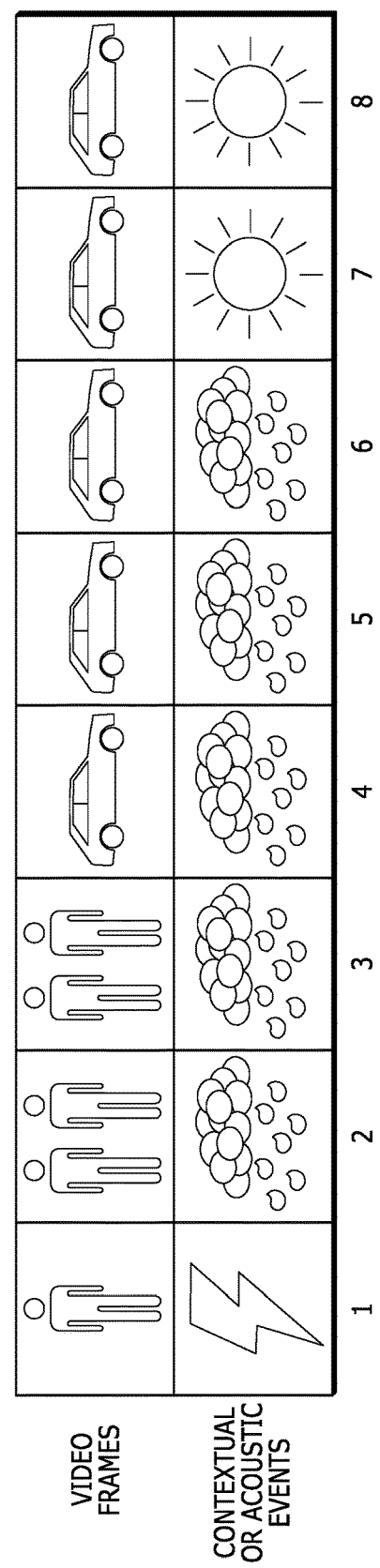
FIG. 6B is a diagram of video frames and corresponding contextual or acoustic events of another exemplary second video.

FIG. 6A illustrates an exemplary first video 605 that includes frames 1 through 8 and corresponding contextual or acoustic events associated with each of the frames. FIG. 6B illustrates an exemplary second video 610 that includes frames 1 through 8 and corresponding contextual or acoustic events associated with each of the frames. As shown in FIGS. 6A and 6B, the first video 605 and the second video 610 include similar content but not identical content (for example, the first video 605 and the second video 610 may have been captured by cameras at the same general location that were located at different vantage points).

In embodiments where the one or more thumbnails are selected based on an acoustic event, the first electronic processor 205 selects the one or more thumbnails to be a frame that was captured at approximately the same time that the sound occurred. For example, the first electronic processor 205 may select frame 7 of the first video 605 to be the first thumbnail because a gunshot occurred during frame 7 (as indicated by the gun symbol in FIG. 6A). In some embodiments, the first electronic processor 205 may select frame 7 as the first thumbnail even when the content of frame 7 (in other words, the vehicle) is not the most prevalent content in the first video 605. The first electronic processor 205 may then select the second thumbnail to be frame 8 of the second video 610, for example because frame 8 includes content that is most prevalent in the second video 610 (in other words, the vehicle). In this example, the first thumbnail and the second thumbnail have a thumbnail similarity that meets or exceeds the predetermined threshold (in other words, both thumbnails show similar views of the same vehicle). Referring back to FIG. 5, at block 540, the first electronic processor 205 may select a new second thumbnail even when the second video 610 better represents the similar content of the first thumbnail and the second thumbnail. In other words, in some embodiments, the first electronic processor 205 selects a new thumbnail by determining that the first thumbnail was selected based on a contextual event or acoustic event in the first video 605 and, thus, should not be re-selected even though the content of the first thumbnail and the second thumbnail is more prevalent in the second video 610. In re-selecting the second thumbnail for the second video 610, the first electronic processor 205 may select a frame that includes the next most prevalent content (for example, frames 2 or 3 of the second video 610) or may select a frame based on a contextual event or acoustic event in the second video 610 (for example, frame 1 that occurred during a lightning strike as indicated by FIG. 6B).

Referring back to FIG. 5, at block 545, the first electronic processor 205 transmits the new thumbnail that replaced either the first thumbnail or the second thumbnail and the other of the first thumbnail and the second thumbnail to the communication device 105 via the first network interface 215. For example, the first electronic processor 205 may transmit information (in other words, parameters or metadata) representative of the thumbnails to the communication device 105. The communication device 105 receives the thumbnails via the second network interface 315 and provides a graphical user interface on the display 320 that includes the thumbnails. In embodiments where the first electronic processor 205 selects one or both of the first thumbnail and the second thumbnail based on a contextual event or an acoustic event, an icon may be displayed on the graphical user interface of the display 320 to indicate the association of the thumbnail to the contextual event or the acoustic event. For example, when the first electronic processor 205 selects the second thumbnail based on a frame corresponding to a time when a gunshot occurred, the display 320 may display an icon in the shape of a gun on or near the second thumbnail.

By executing the method 500, the first electronic processor 205 selects the first thumbnail and the second thumbnail such that the thumbnails include differentiating content and may be more easily differentiated by a user of the communication device 105 even when the videos represented by the thumbnails include similar content.

In some embodiments, the predetermined threshold associated with the thumbnail similarity between the first thumbnail and the second thumbnail may be adjusted to allow for different levels of acceptable differentiation between thumbnails. In some embodiments, the predetermined threshold is adjustable by a user. For example, the user interface of the display 320 of the communication device 105 may receive an input from the user indicating that the predetermined threshold be adjusted. The second electronic processor 305 then adjusts the predetermined threshold based on the input. In embodiments where the communication device 105 does not execute the method 500, the communication device 105 transmits a signal to the device executing the method 500 in response to receiving the input indicating that the predetermined threshold be adjusted. In some embodiments, the method of selecting thumbnails may be adjusted to more heavily weigh certain conditions that may occur in each video. For example, the method of selecting thumbnails may be adjusted to more heavily weigh frames in which movement is determined to be occurring (for example, by the video analytics engine). In such embodiments, frames in which movement is occurring may be selected as thumbnails even though similar content in motionless frames is more prevalent throughout the video. In some embodiments, certain contextual or acoustic events (for example, a gunshot) may be weighted more heavily than other contextual or acoustic events.

Although the method 500 is described previously herein with respect to a first video and a second video, in some embodiments, the method 500 is used to create thumbnails with differentiating content for more than two videos. Similar to the method 500 illustrated in FIG. 5, in such embodiments, the first electronic processor 205 receives a plurality of videos and selects a thumbnail for each video. The first electronic processor 205 then compares the thumbnails of each video to the thumbnails of the other videos and selects new thumbnails as described previously herein until no pair of thumbnails has a thumbnail similarity that meets or exceeds the predetermined threshold. For example, the first electronic processor 205 may repeat the method 500 to compare each video to every other video and select new thumbnails as explained previously herein. In doing so, when a new thumbnail is selected for a given video, the first electronic processor 205 may re-compare the new thumbnail to every other thumbnail to ensure that the new thumbnail is not similar to a previously-selected thumbnail of another video. In such embodiments, the first electronic processor 205 may store discarded frames that were previously selected as thumbnails in the first memory 210 to prevent such frames from being re-selected as a new thumbnail for the same video.

In alternate embodiments, the first electronic processor 205 stores the frame used for each thumbnail of each video in the first memory 210 and selects new thumbnails based on the frames stored in the first memory 210. In other words, the first electronic processor 205 selects each new thumbnail such that the new thumbnail will not have a thumbnail similarity with any other thumbnail that meets or exceeds the predetermined threshold. In such embodiments, the first electronic processor 205 does not re-compare the new thumbnail to every other thumbnail when the new thumbnail is selected.

In some embodiments where the first electronic processor 205 creates thumbnails for more than two videos, the first electronic processor 205 may determine which videos have matching scenes and group such videos together. The first electronic processor 205 may then compare the thumbnails of each video to the other videos within each group of videos having matching scenes. The first electronic processor 205 then selects new thumbnails as described previously herein until no pair of thumbnails in the group of videos has a thumbnail similarity that meets or exceeds the predetermined threshold. The first electronic processor 205 repeats this process for all groups of videos that have matching scenes.

In some embodiments, the first electronic processor 205 initially selects multiple thumbnails from the videos received. In such embodiments, the first electronic processor 205 may select a primary thumbnail for each video (for example, a thumbnail whose content is most prevalent in the video) and store back-up thumbnails for each video in the first memory 210. The back-up thumbnails may be used by the first electronic processor 205 when selecting new thumbnails to replace primary thumbnails of one or more videos during execution of the method 500. The first electronic processor 205 may initially select multiple thumbnails from each video in embodiments where thumbnails are only being selected for two videos and in embodiments where thumbnails are being selected for more than two videos.

In some embodiments, after performing the method 500, the device executing the method 500 may transmit respective information (in other words, parameters or metadata) corresponding to the selected thumbnails for each video (for example, a frame number of the selected thumbnail for each video or a representation of the selected thumbnail for each video) back to the data warehouse 115 to be stored with each respective video. In such embodiments, storage of information corresponding to the selected thumbnails for each video in the data warehouse 115 may allow for less processing during subsequent search queries and video retrievals (for example, when the same videos are included in the results of two different search queries). In some embodiments, the device executing the method 500 may generate thumbnails for one or more videos based on the information corresponding to the selected thumbnails of each video that was stored in the data warehouse 115 when the method 500 was previously executed.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of providing content differentiation between thumbnails, the method comprising:
   receiving, with a network interface, a first video;
   selecting, with an electronic processor, a first thumbnail from the first video;
   receiving, with the network interface, a second video;
   selecting, with the electronic processor, a second thumbnail from the second video;
   determining, with the electronic processor, whether a first scene of the first video matches a second scene of the second video;
   when the first scene of the first video matches the second scene of the second video, comparing, with the electronic processor, the first thumbnail and the second thumbnail to determine a thumbnail similarity;
   when the thumbnail similarity meets or exceeds a predetermined threshold, selecting, with the electronic processor, a new thumbnail to replace either the first thumbnail or the second thumbnail; and
   displaying, on a user interface of a communication device, the new thumbnail and the other of the first thumbnail and the second thumbnail;
   wherein comparing, with the electronic processor, the first thumbnail and the second thumbnail includes determining that the first thumbnail and the second thumbnail include similar content;
   wherein selecting, with the electronic processor, the new thumbnail to replace either the first thumbnail or the second thumbnail includes
      determining a first prevalence score relative to the similar content for the first video;
      determining a second prevalence score relative to the similar content for the second video;
      replacing the first thumbnail with the new thumbnail when the second prevalence score is higher than the first prevalence score; and
   replacing the second thumbnail with the new thumbnail when the first prevalence score is higher than the second prevalence score.

2. The method of claim 1, wherein determining, with the electronic processor, whether the first scene of the first video matches the second scene of the second video includes comparing a first incident identification tag of the first video and a second incident identification tag of the second video.

3. The method of claim 2, wherein comparing the first incident identification tag and the second incident identification tag includes comparing at least one selected from the group of a time that the first video and the second video were captured, a location from which the first video and the second video were captured, and an identification of a camera that captured the first video and the second video.

4. The method of claim 1, wherein displaying, on the user interface of the communication device, the new thumbnail and the other of the first thumbnail and the second thumbnail includes displaying, on the user interface of the communication device, the new thumbnail and the other of the first thumbnail and the second thumbnail in response to a query including specified content.

5. The method of claim 4,
   wherein selecting, with the electronic processor, the first thumbnail from the first video includes selecting, with the electronic processor, the first thumbnail from the first video based on the specified content, the first thumbnail including first content; and
   wherein selecting, with the electronic processor, the second thumbnail from the second video includes selecting, with the electronic processor, the second thumbnail from the second video based on the specified content, the second thumbnail including second content.

6. The method of claim 5, wherein comparing, with the electronic processor, the first thumbnail and the second thumbnail includes comparing the first content and the second content relative to the specified content.

7. The method of claim 1, wherein
   selecting, with the electronic processor, the first thumbnail from the first video includes sampling, with the electronic processor, the first video to create a first plurality of frames, the first thumbnail including at least one of a first single frame from the first plurality of frames and a first plurality of sequential frames from the first plurality of frames; and
   selecting, with the electronic processor, the second thumbnail from the second video includes sampling, with the electronic processor, the second video to create a second plurality of frames, the second thumbnail including at least one of a second single frame from the second plurality of frames and a second plurality of sequential frames from the second plurality of frames.

8. The method of claim 1, wherein at least one of
selecting, with the electronic processor, the first thumbnail from the first video includes selecting, with the electronic processor, the first thumbnail from the first video based on at least one of a first acoustic event and a first contextual event of the first video; and
selecting, with the electronic processor, the second thumbnail from the second video includes selecting, with the electronic processor, the second thumbnail from the second video based on at least one of a second acoustic event and a second contextual event of the second video.

9. The method of claim 1 further comprising transmitting, with the network interface, respective information corresponding to the new thumbnail and the other of the first thumbnail and the second thumbnail to a data warehouse to be stored with each respective video.

10. The method of claim 1, further comprising:
receiving, on the user interface of the communication device, an input indicating that the predetermined threshold be adjusted; and
adjusting, with the electronic processor, the predetermined threshold based on the input.

11. A controller for providing content differentiation between thumbnails, the controller comprising:
an electronic processor; and
a network interface;
wherein the controller is configured to
receive, with the network interface, a first video;
select, with the electronic processor, a first thumbnail from the first video;
receive, with the network interface, a second video;
select, with the electronic processor, a second thumbnail from the second video;
determine, with the electronic processor, whether a first scene of the first video matches a second scene of the second video;
when the first scene of the first video matches the second scene of the second video, compare, with the electronic processor, the first thumbnail and the second thumbnail to determine a thumbnail similarity; and
when the thumbnail similarity meets or exceeds a predetermined threshold, select, with the electronic processor, a new thumbnail to replace either the first thumbnail or the second thumbnail;
wherein the electronic processor determines that the first thumbnail and the second thumbnail include similar content;
wherein the electronic processor selects the new thumbnail to replace either the first thumbnail or the second thumbnail by
determining a first prevalence score relative to the similar content for the first video;
determining a second prevalence score relative to the similar content for the second video;
replacing the first thumbnail with the new thumbnail when the second prevalence score is higher than the first prevalence score; and
replacing the second thumbnail with the new thumbnail when the first prevalence score is higher than the second prevalence score.

12. The controller of claim 11, wherein the electronic processor determines whether the first scene of the first video matches the second scene of the second video by comparing a first incident identification tag of the first video and a second incident identification tag of the second video.

13. The controller of claim 12, wherein the electronic processor compares at least one selected from the group of a time that the first video and the second video were captured, a location from which the first video and the second video were captured, and an identification of a camera that captured the first video and the second video.

14. The controller of claim 11, wherein the controller is further configured to transmit information representing the new thumbnail and the other of the first thumbnail and the second thumbnail to a communication device for displaying the new thumbnail and the other of the first thumbnail and the second thumbnail.

15. The controller of claim 14, wherein the communication device displays a graphical user interface that includes the new thumbnail and the other of the first thumbnail and the second thumbnail in response to a query including specified content,
wherein the first thumbnail is selected based on the specified content and includes first content; and
wherein the second thumbnail is selected based on the specified content and includes second content.

16. The controller of claim 15, wherein the electronic processor compares the first content and the second content relative to the specified content.

17. The controller of claim 11, wherein
the electronic processor samples the first video to create a first plurality of frames and selects at least one of a first single frame from the first plurality of frames and a first plurality of sequential frames from the first plurality of frames as the first thumbnail; and
the electronic processor samples the second video to create a second plurality of frames and selects at least one of a second single frame from the second plurality of frames and a second plurality of sequential frames from the second plurality of frames as the second thumbnail.

18. The controller of claim 11, wherein the electronic processor selects at least one of the first thumbnail and the second thumbnail based on at least one of an acoustic event and a contextual event of the respective first video and second video.

* * * * *